United States Patent
Shimizu (10) Patent No.: US 9,516,180 B2
(45) Date of Patent: Dec. 6, 2016

(54) STORAGE MEDIUM, DEVICE INFORMATION ACQUISITION SYSTEM, AND DEVICE INFORMATION ACQUISITION METHOD

(71) Applicant: KYOCERA Document Solutions Inc., Osaka (JP)

(72) Inventor: Takeo Shimizu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/848,042

(22) Filed: Sep. 8, 2015

(65) Prior Publication Data
US 2016/0080590 A1    Mar. 17, 2016

(30) Foreign Application Priority Data
Sep. 16, 2014  (JP) .................................. 2014-187664

(51) Int. Cl.
| H04N 1/00 | (2006.01) |
| H04L 29/08 | (2006.01) |
| G06F 3/12 | (2006.01) |
| G06F 1/32 | (2006.01) |

(52) U.S. Cl.
CPC ............. *H04N 1/00307* (2013.01); *G06F 1/32* (2013.01); *G06F 3/1204* (2013.01); *G06F 3/1229* (2013.01); *G06F 3/1292* (2013.01); *H04L 67/18* (2013.01); *H04N 1/00392* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

| 2013/0027737 A1* | 1/2013 | Suzuki | G03G 15/5016 358/1.14 |
| 2013/0215467 A1 | 8/2013 | Fein et al. | |
| 2015/0169027 A1* | 6/2015 | Akiba | G06F 1/3209 713/320 |

FOREIGN PATENT DOCUMENTS

JP    2012-023491 A    2/2012

OTHER PUBLICATIONS

The extended European search report issued by the European Patent Office on Feb. 17, 2016, which corresponds to European Patent Application No. 15184027.9-1957 and is related to U.S. Appl. No. 14/848,042.

\* cited by examiner

Primary Examiner — Fan Zhang
(74) Attorney, Agent, or Firm — Studebaker & Brackett PC (57) ABSTRACT

A portable terminal issues a response request to an electronic device. According to a response of the electronic device to the response request, the portable terminal determines a power state of the electronic device and issues a notification of a determination result of the power state. The portable terminal acquires, from an information carrier, location information indicating a location of a main power switch of the electronic device and issues a notification of the location information.

16 Claims, 7 Drawing Sheets

STORAGE MEDIUM, DEVICE INFORMATION ACQUISITION SYSTEM, AND DEVICE INFORMATION ACQUISITION METHOD

INCORPORATION BY REFERENCE

The present application claims priority under 35 U.S.C. §119 to Japanese Patent Application No. 2014-187664, filed on Sep. 16, 2014. The contents of this application are incorporated herein by reference in their entirety.

BACKGROUND

The present disclosure relates to a storage medium, a device information acquisition system, and a device information acquisition method.

Recent tendency shows that users are more and more conscious about power saving and more frequently turn off the main power of image forming apparatuses such as multifunction peripherals. When an image forming apparatus is off, a user wishing to operate the image forming apparatus needs to turn on the main power switch.

Unfortunately, image forming apparatuses of different models have main power switches at different locations. Therefore, users are often required to look for the main power switch. There may be a case where an image forming apparatus installed against a wall has a main power switch on a rear face of the apparatus. In such a case, a user may have a hard time in finding the main power switch located toward the wall.

In some situations, a help desk related to an image forming apparatus is available for users having trouble in operating the image forming apparatus. A staff member of the help desk provides the user with explanation about the necessary operation over the phone. However, a verbal explanation over the phone may not be sufficient to provide clear assistance about necessary operations to the user. Some image forming apparatuses have been developed to address the problem noted above.

In one example, an image forming apparatus can be remotely controlled by a staff member of the help desk to cause hard keys and buttons to illuminate. Though the illumination, the user can determine keys and buttons to operate.

SUMMARY

A non-transitory computer-readable storage medium according to the present disclosure stores a program to be executed by a computer. The program includes a first program code, a second program code, a third program code, a fourth program code, and a fifth program code. The first program code causes the computer to issue a response request to an electronic device. The second program code causes the computer to determine a power state of the electronic device according to a response of the electronic device to the response request. The third program code causes the computer to issue a notification of a determination result of the power state of the electronic device. The fourth program code causes the computer to acquire location information from an information carrier, the location information indicating a location of a main power switch of the electronic device. The fifth program code causes the computer to issue a notification of the location information.

A device information acquisition system according to the present disclosure includes an information carrier, a portable terminal, and an electronic device. The portable terminal and the electronic device are configured to communicate with each other. The information carrier stores therein location information indicating a location of a main power switch of the electronic device. The portable terminal includes a terminal-side communication section, a request processing section, a power state determining section, a power state notifying section, a reading section, and a location information notifying section. The terminal-side communication section communicates with the electronic device. The request processing section issues a response request to the electronic device using the terminal-side communication section. The power state determining section determines a power state of the electronic device according to a response of the electronic device to the response request. The power state notifying section issues a notification of a determination result of the power state determining section. The reading section reads the location information from the information carrier. The location information notifying section issues a notification of the location information. The electronic device includes a device-side communication section and a response processing section. The device-side communication section communicates with the portable terminal. The response processing section issues a response to the response request of the request processing section using the device-side communication section.

A device information acquisition method according to the present disclosure involves: issuing a response request to an electronic device; determining a power state of the electronic device according to a response of the electronic device to the response request; issuing a notification of a determination result of the power state; acquiring location information from an information carrier, the location information indicating a location of a main power switch of the electronic device; and issuing a notification of the location information.

DETAILED DESCRIPTION

The following explains an embodiment of the present disclosure with reference to the drawings. In the drawings, the same or equivalent components are denoted by the same reference signs, and explanation thereof is not repeated.

Figure 1:
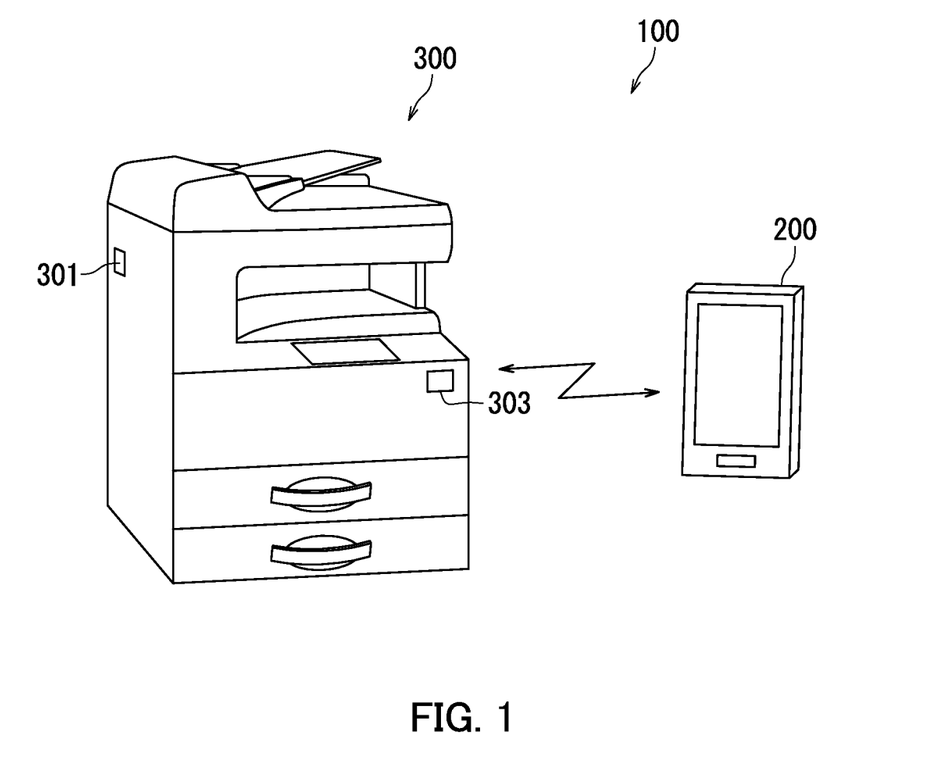
FIG. 1 is a schematic view showing the configuration of a device information acquisition system according to an embodiment of the present disclosure.

FIG. 1 is a schematic view showing the configuration of a device information acquisition system.

As shown in FIG. 1, the device information acquisition system 100 includes a portable terminal 200 and an image forming apparatus 300 (one example of an electronic device) that are communicatively connected to each other. The image forming apparatus 300 has a main power switch 301. The present embodiment employs a near field communication (NFC) method to establish communications. While within a communication coverage area of the image forming apparatus 300, the portable terminal 200 can determine the power state of the image forming apparatus 300. The portable terminal 200 can read information from a radio frequency (RF) tag 303 attached to the image forming apparatus 300. In the present embodiment, the image forming apparatus 300 is switchable between two operation modes, namely a sleep mode (one example of a first mode) and a ready mode (one example of a second mode).

Figure 2:
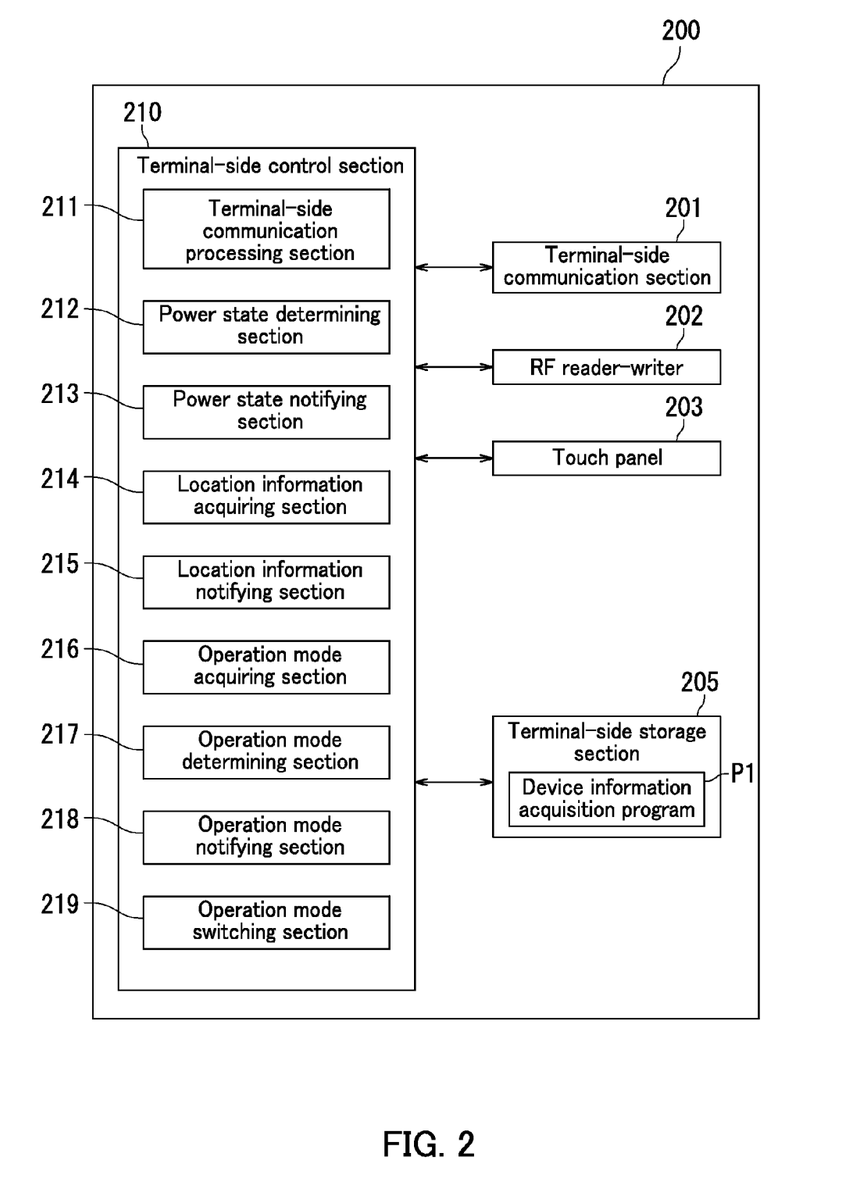
FIG. 2 is a block diagram showing a portable terminal according to the embodiment of the present disclosure.

With reference to FIG. 2, the following describes the portable terminal 200 in detail. FIG. 2 is a block diagram showing the structure of the portable terminal 200. More specifically, FIG. 2 shows the portable terminal 200 used to acquire information about the image forming apparatus 300.

The portable terminal 200 includes a terminal-side communication section 201, an RF reader-writer 202, a touch panel 203, a terminal-side storage section 205, and a terminal-side control section 210.

The terminal-side communication section 201 is a radio communication interface and capable of communicating with electronic devices equipped with a radio communication interface employing the same communication method. In the present embodiment, the terminal-side communication section 201 is a wireless LAN interface.

The RF reader-writer 202 (one example of a reading section) reads information from the RF tag 303 (one example of an information carrier) through electromagnetic induction. In the present embodiment, the RF reader-writer 202 reads the location information of the main power switch 301 from the RF tag 303.

The touch panel 203 (one example of a display section) displays various pieces of information under control of the terminal-side control section 210. For example, the touch panel 203 displays pieces of information, including the power state of the image forming apparatus 300, the location of the main power switch 301, and the operation mode of the image forming apparatus 300. In addition, the touch panel 203 displays thereon operation buttons used to receive input of operations on the portable terminal 200. The touch panel 203 detects a push of an operation button by a user to generate data indicative of the operation and transmits the data to the terminal-side control section 210.

The terminal-side storage section 205 includes read only memory (ROM), random access memory (RAM), a hard disk drive (HDD), and so on. The ROM stores a device information acquisition program P1.

The terminal-side control section 210 controls the relevant sections of the image forming apparatus 300. Through execution of the device information acquisition program P1, the terminal-side control section 210 functions as a terminal-side communication processing section 211, a power state determining section 212, a power state notifying section 213, a location information acquiring section 214, a location information notifying section 215, an operation mode acquiring section 216, an operation mode determining section 217, an operation mode notifying section 218, and an operation mode switching section 219.

The terminal-side communication processing section 211 (one example of a request processing section) controls communications by the terminal-side communication section 201. In the present embodiment, the terminal-side communication processing section 211 issues a response request to the image forming apparatus 300 using the terminal-side communication section 201.

The power state determining section 212 determines the power state (ON or OFF) of the image forming apparatus 300. More specifically the power state determining section 212 determines the power state of the image forming apparatus 300 according to whether a response of the image forming apparatus 300 to a response request transmitted by the terminal-side communication section 201 is received. More specifically, the power state determining section 212 determines that the power state of the image forming apparatus 300 is an ON state on condition that the terminal-side communication section 201 receives a response from the image forming apparatus 300. On the other hand, when the terminal-side communication section 201 does not receive a response from the image forming apparatus 300 by the expiration of a predetermined time period (10 seconds, for example) starting from the transmission of a response request, the power state determining section 212 determines that the poser state of the image forming apparatus 300 is an OFF state.

The power state notifying section 213 displays the power state of the image forming apparatus 300 on the touch panel 203. Through the display, the user is notified of the power state of the image forming apparatus 300. More specifically, when the power state determining section 212 determines that the image forming apparatus 300 is OFF, the power state notifying section 213 displays the power state indicating that the image forming apparatus 300 is OFF on the touch panel 203.

The location information acquiring section 214 acquires the location information of the main power switch 301 from the RF tag 303 using the RF reader-writer 202.

The location information notifying section 215 displays the location information acquired by the location information acquiring section 214 on the touch panel 203. Through the display, the user is notified of the location of the main power switch 301 of the image forming apparatus 300. In the present embodiment, the location information of the main power switch 301 is image data visually indicating the location of the main power switch 301 of the image forming apparatus 300.

When the power state determining section 212 determines that the power state of the image forming apparatus 300 is the ON state, the operation mode acquiring section 216 acquires the current operation mode of the image forming apparatus 300 using the terminal-side communication section 201. More specifically, the operation mode acquiring section 216 issues to the image forming apparatus 300 a request for transmission of the operation mode. In response to the request, the image forming apparatus 300 transmits information indicating the current operation mode of the image forming apparatus 300 to the portable terminal 200.

The operation mode determining section 217 determines whether the operation mode acquired by the operation mode acquiring section 216 is the sleep mode or the ready mode.

The operation mode notifying section 218 displays on the touch panel 203 the operation mode as determined by the operation mode determining section 217. Through the display, the user is notified of the current operation mode of the image forming apparatus 300.

More specifically, when the operation mode determining section 217 determines that the image forming apparatus 300 is in the ready mode, the operation mode notifying section 218 displays an indication that the image forming apparatus 300 is in the ready mode on the touch panel 203.

When the operation mode determining section 217 determines that the image forming apparatus 300 is in the sleep mode, the operation mode notifying section 218 displays an indication that the image forming apparatus 300 is in the sleep mode on the touch panel 203. When the image forming apparatus 300 is determined to be in the sleep mode, the operation mode notifying section 218 also displays on the touch panel 203 an operation button for switching the operation mode of the image forming apparatus 300. In other words, an operation button for switching the operation mode of the image forming apparatus 300 from the sleep mode to the ready mode (hereinafter, "Sleep cancel button" 204) is displayed on the touch panel 203.

The operation mode switching section 219 performs a process of switching the operation mode of the image forming apparatus 300 from the sleep mode to the ready mode. In the present embodiment, upon detecting a push of the Sleep cancel button 204 by a user, the touch panel 203 generates operation input data indicative of the push of the Sleep cancel button 204. The operation input data thus generated is transmitted to the operation mode switching section 219. Based on the operation input data received, the operation mode switching section 219 transmits an instruction for switching the operation mode (hereinafter, "switching instruction") to the image forming apparatus 300.

Figure 3:
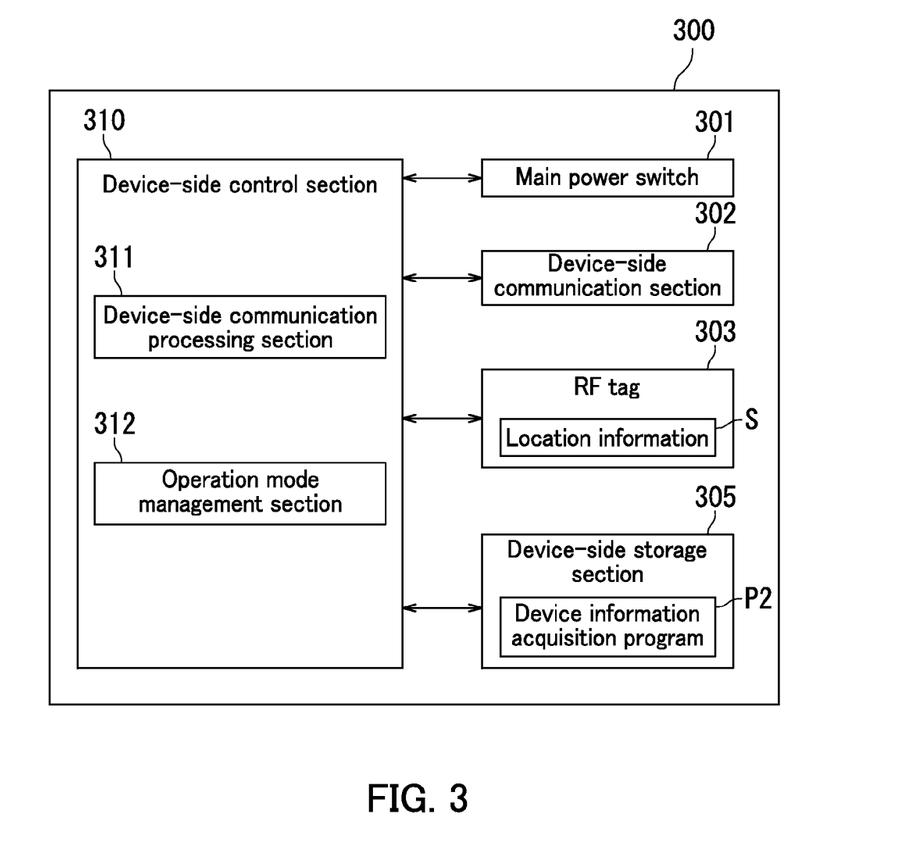
FIG. 3 is a block diagram showing an image forming apparatus according to the embodiment of the present disclosure.

With reference to FIG. 3, the following describes the image forming apparatus 300 in detail. FIG. 3 is a block diagram showing the structure of the image forming apparatus 300.

As shown in FIG. 3, the image forming apparatus 300 includes the main power switch 301 and the RF tag 303 and additionally includes a device-side communication section 302, a device-side storage section 305, and a device-side control section 310. In the present embodiment, the image forming apparatus 300 is a multifunction peripheral (MFP).

The main power switch 301 switches the power state (ON and OFF) of the image forming apparatus 300. While the main power switch 301 is ON, the image forming apparatus 300 receives power supply. While the main power switch 301 is OFF, the image forming apparatus 300 receives no power supply.

The device-side communication section 302 is a wireless LAN interface. The device-side communication section 302 implements a radio communication interface in the communication system compliant with the communication method of the portable terminal 200 and thus can communicate with the portable terminal 200.

The RF tag 303 is provided with an internal memory. Data stored on the internal memory is read by the RF reader-writer 202 through electromagnetic induction. The internal memory of the RF tag 303 stores the location information S of the main power switch 301.

The device-side storage section 305 includes ROM, RAM, and HDD. The ROM stores a device information acquisition program P2.

The device-side control section 310 controls operation of the relevant sections of the image forming apparatus 300. Through execution of the device information acquisition program P2, the device-side control section 310 functions as a device-side communication processing section 311 and an operation mode management section 312.

The device-side communication processing section 311 (one example of a response processing section) controls communications performed by the device-side communication section 302. In the present embodiment, the device-side communication processing section 311 responds to a request from the portable terminal 200 using the device-side communication section 302.

The operation mode management section 312 transmits information indicating the current operation mode of the image forming apparatus 300 to the portable terminal 200 in response to a request from the operation mode acquiring section 216 of the portable terminal 200. The operation mode management section 312 also switches the operation mode of the image forming apparatus 300 according to a switching instruction issued from the operation mode switching section 219 of the portable terminal 200.

Figure 4:
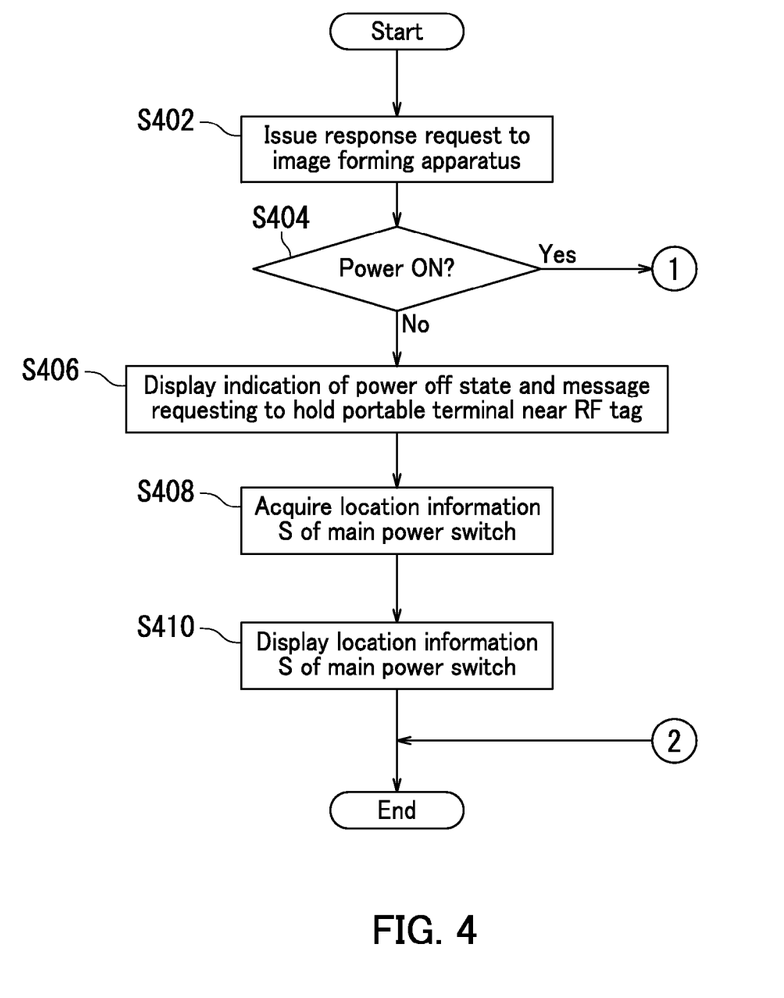
FIG. 4 is a flowchart of operation of the device information acquisition system according to the embodiment of the present disclosure.
Figure 5:
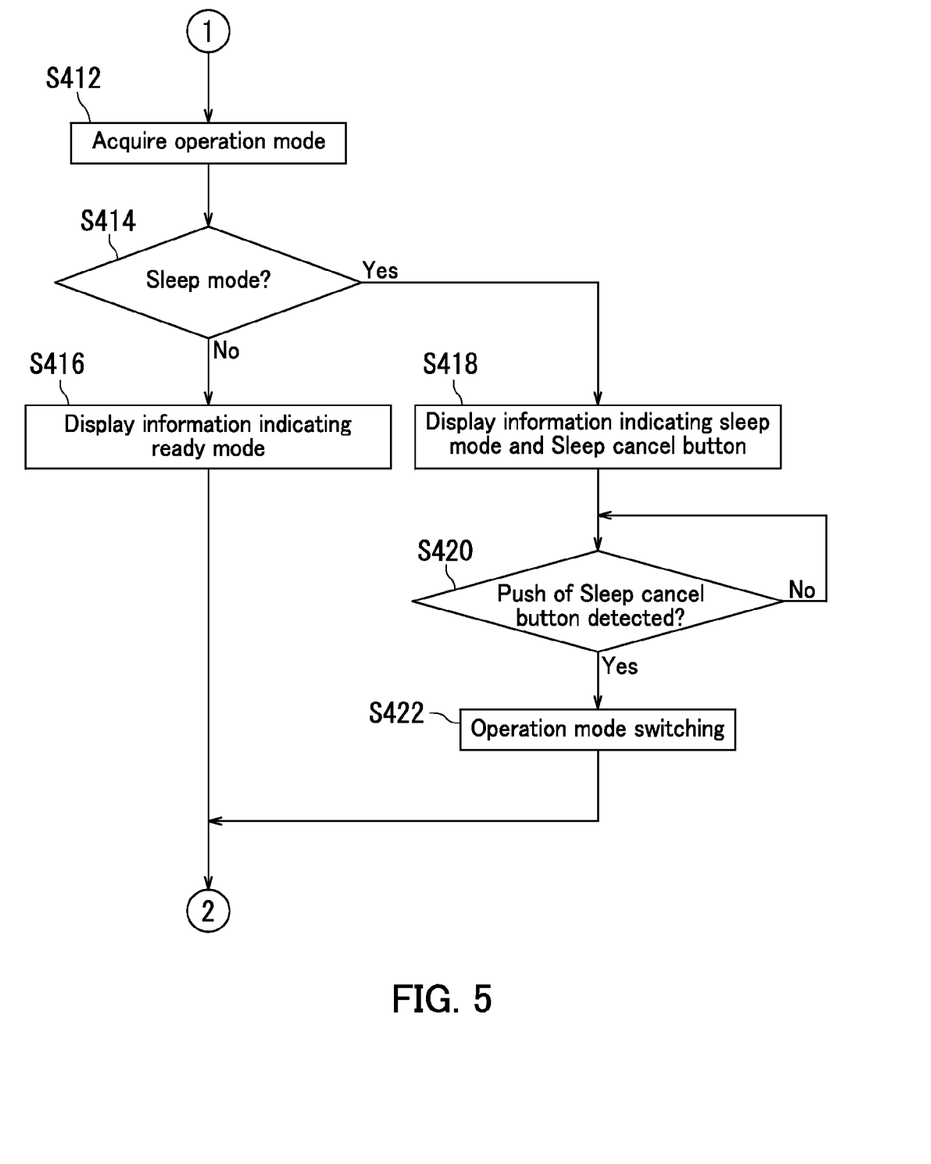
FIG. 5 is a flowchart of operation of the device information acquisition system according to the embodiment of the present disclosure.

The following describes operation of the device information acquisition system 100 with reference to FIGS. 1 to 5. FIGS. 4 and 5 show a flowchart of operation of the device information acquisition system 100.

When a user operates the touch panel 203 to cause the portable terminal 200 to perform a process of checking the power state of the image forming apparatus 300, the terminal-side communication processing section 211 issues a response request to the image forming apparatus 300 (Step S402) as shown in FIG. 4. Then, the power state determining section 212 determines the power state of the image forming apparatus 300 (Step S404). More specifically, the power state determining section 212 determines that the power state of the image forming apparatus 300 is the OFF state when no response is received from the image forming apparatus 300 by the expiration of the predetermined time period starting from the issuance of the response request by the terminal-side communication section 201 (Step S404, No). When the terminal-side communication section 201 receives a response from the image forming apparatus 300, the power state determining section 212 determines that the power state of the image forming apparatus 300 is the ON state (Step S404, Yes).

When the power state determining section 212 determines that the power state of the image forming apparatus 300 is the OFF state (Step S404, No), the power state notifying section 213 displays information indicating that the image forming apparatus 300 is OFF on the touch panel 203 (Step S406). The power state notifying section 213 also guides the user to perform the next action (operation) by displaying on the touch panel 203 a message requesting the user to hold the portable terminal 200 (RF reader-writer 202) near the RF tag 303 (Step S406). In one example, the RF reader-writer 202 reads the location information S stored on the internal memory of the RF tag 303 when the distance from the RF reader-writer 202 to the RF tag 303 is 10 cm or closer.

When the user holds the RF reader-writer 202 near the RF tag 303, the RF reader-writer 202 reads and acquires the location information S stored on the internal memory of the RF tag 303 (Step S408). Next, the location information notifying section 215 displays the location information S on the touch panel 203 (Step S410).

With reference to FIG. 5, the following describes operation of the device information acquisition system 100 subsequently to the determination by the power state determining section 212 that the power state of the image forming apparatus 300 is ON (Step S404, Yes).

As shown in FIG. 5, upon determination by the power state determining section 212 that the power state of the image forming apparatus 300 is the ON state, first, the operation mode acquiring section 216 acquires the current operation mode of the image forming apparatus 300 from the operation mode management section 312 (Step S412). Next, the operation mode determining section 217 determines whether or not the operation mode acquired by the operation mode acquiring section 216 is the sleep mode or not (Step S414).

When the operation mode determining section 217 determines that the operation mode of the image forming apparatus 300 is not the sleep mode (Step S414, No), the operation mode notifying section 218 displays information indicating that the image forming apparatus 300 is in the ready mode on the touch panel 203 (Step S416).

On the other hand, when the operation mode determining section 217 determines that the operation mode of the image forming apparatus 300 is the sleep mode (Step S414, Yes), the operation mode notifying section 218 displays information indicating that the image forming apparatus 300 is in the sleep mode on the touch panel 203 (Step S418). In addition, the operation mode notifying section 218 displays the Sleep cancel button 204 on the touch panel 203 (Step S418).

The processing is held in standby until the touch panel 203 detects a push of the Sleep cancel button 204 (Step S420, No). Upon detecting a push of the Sleep cancel button 204 (Step S420, Yes), the touch panel 203 generates operation input data indicative of the push of the Sleep cancel button 204. The operation input data thus generated is transmitted to the operation mode switching section 219.

According to the operation input data indicative of the push of the Sleep cancel button 204, the operation mode switching section 219 transmits a switching instruction to the image forming apparatus 300. In response, the operation mode management section 312 of the image forming apparatus 300 switches the operation mode of the image forming apparatus 300 from the sleep mode to the ready mode (Step S422).

Figure 6A:
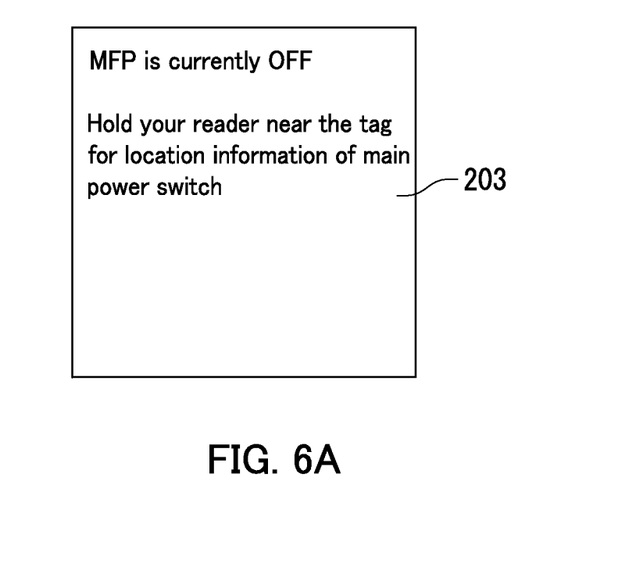
FIG. 6A is an example of a screen image according to the embodiment of the present disclosure, the screen image indicating that the power of the image forming apparatus is OFF.
Figure 6B:
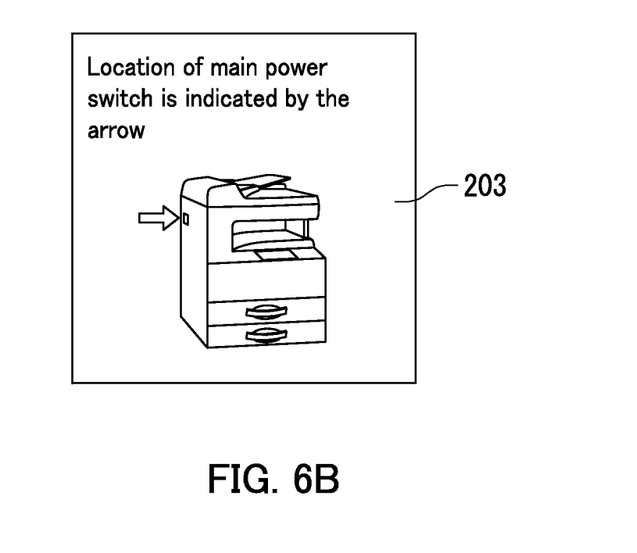
FIG. 6B is an example of a screen image according to the embodiment of the present disclosure, the screen image displaying location information of a main power switch.

With reference to FIGS. 1 to 3, 6A, and 6B, the following describes screen images displayed on the touch panel 203 when the image forming apparatus 300 is OFF. FIG. 6A shows one example of a screen image indicating that the image forming apparatus 300 is OFF. FIG. 6B shows one example of a screen image presenting the location information S of the main power switch 301.

The screen image shown in FIG. 6A is displayed on the touch panel 203 when the power state determining section 212 determines that the image forming apparatus 300 is OFF. As shown in FIG. 6A, the screen image displayed on the touch panel 203 includes an indication that the image forming apparatus 300 is OFF and a message requesting the user to hold the RF reader-writer 202 near the RF tag 303.

When the user holds the RF reader-writer 202 near the RF tag 303, the RF reader-writer 202 reads and acquires the location information S stored on the internal memory of the RF tag 303. As a result, the screen image shown in FIG. 6B is displayed on the touch panel 203. As shown in FIG. 6B, the screen image displayed on the touch panel 203 includes an image representing the image forming apparatus 300 with an arrow pointing at the location of the main power switch 301.

Figure 7A:
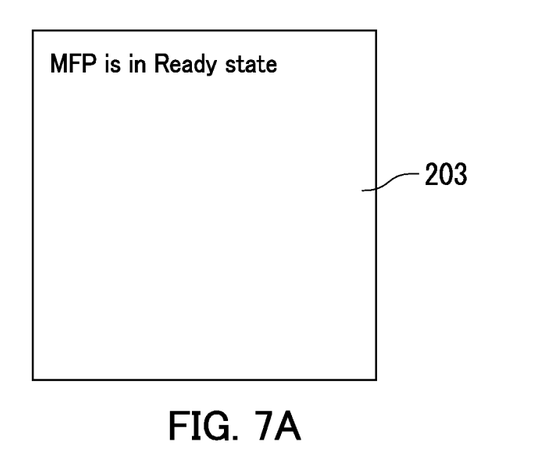
FIG. 7A is an example of a screen image according to the embodiment of the present disclosure, the screen image displaying a ready mode that is one of operation modes of the image forming apparatus.
Figure 7B:
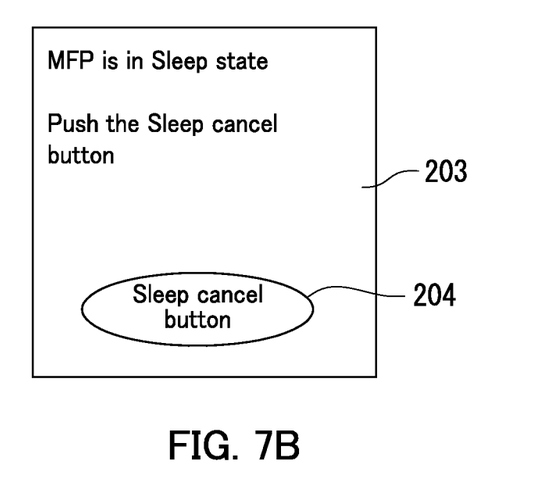
FIG. 7B is an example of a screen image according to the embodiment of the present disclosure, the screen image displaying a sleep mode that is one of the operation modes of the image forming apparatus.

With reference to FIGS. 1 to 3, 7A, and 7B, the following describes a screen image displayed on the touch panel 203 when the image forming apparatus 300 is ON. FIG. 7A shows one example of a screen image indicating that the operation mode is the ready mode. FIG. 7B shows one example of a screen image indicating that the operation mode is the sleep mode.

When the power state determining section 212 determines that the image forming apparatus 300 is ON, the operation mode acquiring section 216 acquires the current operation mode of the image forming apparatus 300. Upon acquisition of the current operation mode of the image forming apparatus 300 by the operation mode acquiring section 216, the screen image shown in FIG. 7A or 7B is displayed on the touch panel 203.

FIG. 7A shows a screen image displayed on the touch panel 203 when the image forming apparatus 300 is in the ready mode. As shown in FIG. 7A, the screen image displayed on the touch panel 203 includes an indication that the image forming apparatus 300 is in the ready mode (Ready state).

FIG. 7B shows a screen image displayed on the touch panel 203 when the image forming apparatus 300 is in the sleep mode. As shown in FIG. 7B, the screen image displayed on the touch panel 203 includes an indication that the image forming apparatus 300 is in the sleep mode (Sleep state), a guidance for canceling the sleep mode, and the Sleep cancel button 204.

In response to a push by the user of the Sleep cancel button 204 displayed on the touch panel 203, the touch panel 203 generates operation input data indicative of the push of the Sleep cancel button 204. According to the operation input data received, the operation mode switching section 219 transmits a switching instruction to the image forming apparatus 300. According to the switching instruction transmitted from the operation mode switching section 219, the operation mode management section 312 of the image forming apparatus 300 switches the operation mode from the sleep mode to the ready mode.

As has been described above, the portable terminal 200 can be used to read and acquire the location information S of the main power switch 301 from the RF tag 303 and displays the location of the main power switch 301 on the touch panel 203. This notifies the user of the location of the main power switch 301, which improves the user convenience. In addition, the location of the main power switch 301 may be displayed by presenting an image visually indicating the location of the main power switch 301 of the image forming apparatus 300. This allows the user to visually recognize the location of the main power switch 301. That is, this allows the user to more easily recognize the location of the main power switch 301.

In addition, when the image forming apparatus 300 is in the sleep mode, the portable terminal 200 can display on the touch panel 203 an indication that the image forming apparatus 300 is in the sleep mode. This is effective to prevent the user from erroneously operating the main power switch 301 with an intention of turning on the image forming apparatus 300 although the image forming apparatus 300 is in the sleep mode. This improves the user convenience.

The above has described the embodiment of the present disclosure with reference to the accompanying drawings (FIGS. 1 to 5, 6A, 6B, 7A, and 7B). However, the present disclosure is not limited to the embodiment specifically described above and may be practiced in many different manners without departing from the essence of the present disclosure.

For example, according to the embodiment described above, the power state notifying section 213 displays the power state of the image forming apparatus 300 on the touch panel 203 only when the image forming apparatus 300 is determined to be OFF by the power state determining section 212. Alternatively, however, the power state notifying section 213 may display the power state of the image forming apparatus 300 on the touch panel 203 also when the image forming apparatus 300 is determined to be ON by the power state determining section 212.

In addition, according to the embodiment of the present disclosure, the portable terminal 200 issues a notification of the current operation mode of the image forming apparatus 300 in addition to a notification of the power state of the image forming apparatus 300. Alternatively, however, the portable terminal 200 may issue a notification of the power state of the image forming apparatus 300 only. In this case, the power state notifying section 213 displays on the touch panel 203 whether the image forming apparatus 300 is ON or OFF.

In addition, although the embodiment of the present disclosure is directed to the terminal-side communication section 201 and the device-side communication section 302 each being a wireless LAN interface, the terminal-side communication section 201 and the device-side communication section 302 are not limited to such. The terminal-side communication section 201 and the device-side communication section 302 each may for example be a Bluetooth (registered Japanese trademark) interface.

In addition, according to the embodiment of the present disclosure, the location information of the main power switch 301 is stored on the RF tag. However, a medium used to store the location information of the main power switch 301 is not limited to such. For example, a two-dimensional barcode may be used as the medium carrying the location information of the main power switch 301. In such a case, the portable terminal 200 includes an IrDA interface as a two-dimensional barcode reader alternatively to the RF reader-writer 202.

In addition, although the embodiment of the present disclosure employs electromagnetic induction to carry data transfer between the RF tag and the RF reader-writer, the technology for the data transfer between the RF tag and the RF reader-and write is not limited to such. For example, the data transfer may be carried out through electric waves.

In addition, according to the embodiment of the present disclosure, the operation mode of the image forming apparatus 300 is switched in response to a push of the Sleep cancel button 204. However, a method for triggering switching of the operation mode of the image forming apparatus 300 is not limited to such. For example, a push of a key on an operation panel of the image forming apparatus 300 may trigger switching of the operation mode of the image forming apparatus 300. In this case, the screen image shown in FIG. 7B includes a message indicating that a push of a key on the operation panel of the image forming apparatus 300 will trigger switching of the operation mode of the image forming apparatus 300 from the sleep mode to the ready mode.

In addition, the embodiment of the present disclosure is directed to an example of the device information acquisition system 100 including a multifunction peripheral. Alternatively, the present application is applicable to a system including a copier, a facsimile machine, or a printer.

In addition, the embodiment of the present disclosure is directed to an example of the device information acquisition system 100 including the image forming apparatus 300.

Alternatively, however, the present disclosure is applicable to a system including an electronic device other than an image forming apparatus. For example, the present disclosure is applicable to a system including an electronic device having a main power switch, such as a personal computer.

What is claimed is:

1. A non-transitory computer-readable storage medium storing a program that is used in a device information acquisition system including an information carrier, a portable terminal, and an electronic device and is to be executed by a computer embodied in the portable terminal,
    the portable terminal and the electronic device being communicable with each other,
    the information carrier storing therein location information indicating a location of a main power switch of the electronic device,
    the portable terminal including:
        a terminal-side communication section that communicates with the electronic device; and
        a reading section that reads the location information from the information carrier,
    the reading section reading the location information when the portable terminal is held near the information carrier,
    the electronic device including a device-side communication section that communicates with the portable terminal, the program comprising:
        a first program code configured to cause the computer to issue a response request to the electronic device through the terminal-side communication section;
        a second program code configured to cause the computer to determine a power state of the electronic device according to a response of the electronic device to the response request;
        a third program code configured to cause the computer to issue a notification of a determination result of the power state of the electronic device;
        a fourth program code configured to cause the computer to acquire the location information from the information carrier through the reading section; and
        a fifth program code configured to cause the computer to issue a notification of the acquired location information, wherein
    the second program code causes the computer to determine that
        the power state of the electronic device is an ON state on condition that the terminal-side communication section receives the response by expiration of a predetermined time period starting from transmission of the response request to the electronic device, and
        the power state of the electronic device is an OFF state on condition that the terminal-side communication section does not receive the response by expiration of the predetermined time period starting from transmission of the response request to the electronic device, the OFF state being a state in which no power is supplied to the electronic device, and
    the third program code causes the computer to issue, when the power state of the electronic device is the OFF state, a notification of an action to hold the portable terminal near the information carrier that is an action to be performed by a user needing the location information.

2. The non-transitory computer-readable storage medium according to claim 1, the program further comprising:
    a sixth program code configured to cause the computer to, when the power state of the electronic device is the ON state, acquire an operation mode that the electronic device is in through the terminal-side communication section; and a seventh program code configured to cause the computer to issue a notification of the acquired operation mode.

3. The non-transitory computer-readable storage medium according to claim 2, wherein the operation mode of the electronic device is switchable between a first mode and a second mode, and the seventh program code causes the computer to issue a notification that the electronic device is in the first mode or that the electronic device is in the second mode.

4. The non-transitory computer-readable storage medium according to claim 3, the program further comprising an eighth program code configured to cause the computer, when the electronic device is in the first mode, to switch the operation mode from the first mode to the second mode.

5. The non-transitory computer-readable storage medium according to claim 4, wherein the portable terminal further includes a display section, when the operation mode currently set in the electronic device is the first mode, the seventh program code causes the computer to display an operation button for switching the operation mode from the first mode to the second mode on the display section, and when it is detected that the operation button is pressed, the eighth program code causes the computer to issue through the terminal-side communication section an instruction instructing the electronic device to switch the operation mode from the first mode to the second mode.

6. A device information acquisition system comprising an information carrier, a portable terminal, and an electronic device, wherein the portable terminal and the electronic device are configured to communicate with each other, the information carrier stores therein location information indicating a location of a main power switch of the electronic device, the portable terminal includes:
  a terminal-side communication section configured to communicate with the electronic device;
  a request processing section configured to issue a response request to the electronic device using the terminal-side communication section;
  a power state determining section configure to determine a power state of the electronic device according to a response of the electronic device to the response request;
  a power state notifying section configured to issue a notification of a determination result of the power state determining section;
  a reading section configured to read the location information from the information carrier; and
  a location information notifying section configured to issue a notification of the location information, and the electronic device includes:
  a device-side communication section configured to communicate with the portable terminal; and
  a response processing section configured to issue a response to the response request of the request processing section using the device-side communication section, the power state determining section determines that
  the power state of the electronic device is an ON state on condition that the terminal-side communication section receives the response by expiration of a predetermined time period starting from transmission of the response request to the electronic device, and
  the power state of the electronic device is an OFF state on condition that the terminal-side communication section does not receive the response by expiration of the predetermined time period starting from transmission of the response request to the electronic device, the OFF state being a state in which no power is supplied to the electronic device, when the power state of the electronic device is the OFF state, the power state notifying section issues a notification of an action to hold the portable terminal near the information carrier that is an action to be performed by a user needing the location information, and when the portable terminal is held near the information carrier, the reading section reads the location information from the information carrier.

7. The device information acquisition system according to claim 6, wherein an operation mode of the electronic device is switchable between a first mode and a second mode, and the portable terminal includes:
  an operation mode acquiring section configured to acquire the operation mode that the electronic device is in using the terminal-side communication section, the acquisition being performed when the power state of the electronic device is determined to be the ON state; and
  an operation mode notifying section configured to issue a notification of the operation mode acquired by the operation mode acquiring section.

8. The device information acquisition system according to claim 7, wherein the portable terminal further includes an operation mode switching section configured to issue a switching instruction to the electronic device when the electronic device is in the first mode, the switching instruction instructing the electronic device to switch the operation mode from the first mode to the second mode, and the electronic device further includes an operation mode management section configured to switch the operation mode from the first mode to the second mode according to the switching instruction from the operation mode switching section.

9. The device information acquisition system according to claim 8, wherein the portable terminal further includes a display section, when the operation mode currently set in the electronic device is the first mode, the operation mode notifying section causes the display section to display an operation button for switching the operation mode from the first mode to the second mode, and when it is detected that the operation button is pressed, the operation mode switching section issues an instruction instructing the electronic device to switch the operation mode from the first mode to the second mode.

10. The device information acquisition system according to claim 6, wherein the information carrier is included in the electronic device.

11. The device information acquisition system according to claim 6, wherein
the reading section comprises an RF reader-writer, and
the information carrier comprises an RF tag.

12. A device information acquisition method comprising:
issuing a response request to an electronic device;
determining a power state of the electronic device according to a response of the electronic device to the response request;
issuing a notification of a determination result of the power state;
acquiring location information from an information carrier, the location information indicating a location of a main power switch of the electronic device; and
issuing a notification of the location information, wherein
the determining of the power state involves:
  determining that the power state of the electronic device is an ON state on condition that the response is received by expiration of a predetermined time period starting from transmission of the response request to the electronic device, and
  determining that the power state of the electronic device is an OFF state on condition that the response is not received by expiration of the predetermined time period starting from transmission of the response request to the electronic device,
no power is supplied to the electronic device during the power state of the electronic device being the OFF state,
the issuing of the notification of the determination result of the power state involves issuing, when the power state of the electronic device is the OFF state, a notification of an action to hold a portable terminal near the information carrier that is an action to be performed by a user needing the location information, and
the location information is acquired from the information carrier by the portable terminal being held near the information carrier.

13. The device information acquisition method according to claim 12, further comprising:
acquiring, when the power state of the electronic device is the ON state, an operation mode that the electronic device is in; and
issuing a notification of the acquired operation mode.

14. The device information acquisition method according to claim 13, wherein
the operation mode of the electronic device is switchable between a first mode and a second mode,
the issuing of the notification of the acquired operation mode involves issuing a notification that the electronic device is in the first mode or that the electronic device is in the second mode.

15. The device information acquisition method according to claim 14, further comprising
switching the operation mode of the electronic device from the first mode to the second mode when the electronic device is in the first mode.

16. The device information acquisition method according to claim 15, wherein
the issuing of the notification of the acquired operation mode involves displaying, when the operation mode currently set in the electronic device is the first mode, an operation button for switching the operation mode from the first mode to the second mode on a display section, and
the switching of the operation mode of the electronic device from the first mode to the second mode involves issuing, when it is detected that the operation button is pressed, an instruction instructing the electronic device to switch the operation mode from the first mode to the second mode.

* * * * *